United States Patent Office 2,861,978
Patented Nov. 25, 1958

2,861,978

ACID POLYMERIZATION OF BUTADIENE 1,3-FURFURAL REACTION PRODUCT

Mortimer T. Harvey, South Orange, and Peter L. Rosamilia, Newark, N. J., assignors to Harvel Research Corporation, a corporation of New Jersey No Drawing. Application June 9, 1954
Serial No. 435,622

10 Claims. (Cl. 260—67)

This invention relates to novel compositions of matter and to methods for preparing the same. In one of its more specific aspects the invention is directed to methods for treating furfural-butadiene reaction products and also to novel products produced thereby.

Prior to this invention furfural and butadiene 1,3 were reacted under varying conditions to produce a variety of reaction products. Some of the products of such reactions are dark colored tarry residues which may vary in consistency from dark practically solid, semi-solid to fairly fluid lighter colored liquid masses. Such masses are composed chiefly of complex mixtures of reaction products of butadiene and furfural in various molecular proportions generally 1:1 and/or 2:1 and with a substantial part being in polymeric form.

For a long time such dark colored, tarry masses were not found useful commercially and were long regarded and treated as useless waste products presenting a disposal problem. Such by-products are formed during the extractive distillation of a $C_4$ hydrocarbon mixture containing butadiene employing furfural as the selective solvent and are generally known in the art as residues formed in the furfural extractive distillation method for purification of butadiene. In commercial practice as known to us such by-products were disposed of by burning, in some instances.

We have discovered that furfural-butadiene reaction products and particularly said by-products or waste products may be easily and readily homopolymerized to provide high molecular weight products finding utility in a number of different fields. Throughout this specification and claims all parts by weight unless otherwise specifically indicated.

According to this invention said furfural-butadiene reaction products as well as said by-products or waste products, all of which will hereinafted be termed products (I) may be homopolymerized at a temperature of at least approximately 220° F. and generally in factory practice in the approximate temperature range of 250–450° F. in the presence of an acidic agent in amount equal to the acidic polymerization equivalent of at least 1 part by weight of sulphuric acid for each 200 parts of product (I). Said furfural-butadiene reaction products in general have a pH of approximately 5 and according to this invention the quantity and nature of the acidic agent employed is such that the pH of a mixture of acid agent and said product is lowered to a value no greater than approximately 3.5 but may be as low as desired, depending upon the speed of reaction required. In factory practice we prefer to carry out said polymerization at a pH in the range of approximately 1.5 to approximately 3.5 although lower pH conditions as low as .3 may be employed. (The method for measuring the pH is to place 10 grams of the material whose pH is to be determined in 100 grams of distilled water, heat the mix to boiling while stirring, allow to cool to room temperature and take the pH by means of pH papers. The pH papers employed were those known as "Hydrion" by Micro Essential Labs. of Brooklyn, New York.)

The polymerization may be continued to provide the desired degree of polymerization which may be as low as desired to provide polymers at least twice the molecular weight of the starting material up to and including the conversion of product (I) to the substantially solid and infusible state, that is, that it will be substantially solid at temperatures as high as 500° F. and at room temperature (70° F.) will be at least 80% insoluble when mixed with an equal part of furfural. In general the mixture of product (I) and an acidic agent in amount sufficient to impart a pH no greater than approximately 3.5 and as low as desired may be heated to a temperature of at least 250° F. in factory practice and such heating is continued until a 10 gram sample thereof dissolved in 5 grams of furfural provides a solution having a viscosity at 25° C. at least 100% greater than that of a solution of a 10 gram sample of said original product (I) in 5 grams of furfural. Among some of the acidic agents which may be employed in the practice of this invention are sulphuric acid, hydrochloric acid, phosphoric acid, fluoboric acid, boron trifluoride, paratoluene sulfonic acid, alkyl sulphates such as the mono- and dialkyl sulphates, mono- or di-methyl, ethyl, propyl, etc. sulphates, phosphates, etc.

Some of the starting materials products (I) which may be employed in the practice of this invention and the methods for polymerizing them will be hereinafter set forth merely to illustrate the invention.

Example A

There is collected and obtained a batch of what is known in the art as the "polymeric residue formed in the furfural extractive distillation method for the purification of butadiene." (A report on such residues appears in an article entitled "Butadiene-Furfural Copolymers," by Hillyer et al., Ind. and Eng. Chem., vol. 40, November 1948, pp. 2216–2220, reference to which is hereby made.) Such residues, which for a long time were regarded as waste products, are generally combined with water and such masses contain an amount of water by weight in the range of 5%–20% of the mass, and such masses will hereinafter be termed (M).

Example B

If desired said masses of water laden products (I) known as masses (M) may be heated at temperatures of 200° F.–500° F. either at atmospheric or reduced pressure conditions to substantially completely dehydrate the mass and when the higher temperatures, say 300–500° F., in said range are employed, furfural-butadiene reaction products come off as a distillate and are collected and are hereinafter known as products (D), leaving behind a residual mass which is substantially completely dehydrated and having had fraction product (D) removed at least in part therefrom. Such dehydrated residual masses of said residues from which at least part of product (D) has been removed therefrom under vacuum, are known as products (R) and generally are dark colored tarry masses which vary in consistency from substantially solid, semi-solid, to fairly fluid lighter colored liquids, all being substantially soluble in furfural, and all being liquid or capable of exhibiting flow at 400° F. and having softening point (ball and ring) no greater than 300° F., and all being at least 50% soluble in acetone. The distillates which are known as products (D) are free flowing liquids soluble in furfural and being at least 50% soluble in acetone and also have a softening point (ball and ring) greatly below 200° F. and also are liquid at temperatures of 300° F., are furfural-butadiene reaction products and apparently in the main comprise copolymeric butadiene and furfural, with the mole ratio of butadiene to furfural being 2 to 1. The consistency of the masses (M) both before and after dehydration with or without the removal of products (D) therefrom and the yields of products (D) and (R) vary depending upon the conditions of operation of the main extractive distillation units as well as the distillation units in the furfural extractive distillation method used.

Illustrative examples of products (I) employed in the practice of the invention are those which are liquid at 400° F. and are the masses (M), also such masses (M) which have been dehydrated and from which 0-20% by weight thereof calculated on a dry basis has been distilled off, and also such masses (M) which have been dehydrated and from which 20-40% by weight thereof calculated on a dry basis has been distilled off, and also the residual masses (R), and the distillates (D). However, we are primarily concerned with said products (I) which have a molecular weight of at least 330, viscosity of at least 2000 centipoises at 25° C. and softening point (ball and ring) of at least 60° F., are soluble in furfural and are liquid at 300° F.

Example 1

200 parts by weight of any of said products (I) is mixed with an acidic agent and preferably a strong acidic agent or catalyst in amount equal to approximately 1–5 parts of the sulphuric acid or an amount of another acidic agent or catalyst polymerizing equivalent of approximately 1–5 parts of sulphuric acid to reduce the pH thereof to a value between about 0.3 to about 3.5. The temperature of the mix is elevated to at least approximately 220° F. and maintained thereat or preferably in the range of approximately 250°-450° F. until the desired degree of polymerization is attained and may be continued until the organic mass is converted to the substantially solid and infusible state and in that state the mass is substantially solid at 500° F. and is more than 80% insoluble in furfural. It is preferable that the acidic agents be first dissolved in a solvent and a solution thereof added to the product (I) to be polymerized to obtain an easier and more uniform mixture and to prevent local action. By employing this method there may be produced a great variety of polymers of product (I) some of which are liquid at 450° F. and others are solid at this temperature, the former being useful for chemical and physical combination with other substances, such as (II) normally solid polymers of vinyl esters, such as vinyl chloride, vinyl acetate, etc. and copolymers of vinyl acetate and vinyl chloride, polyvinyl acetals, such as polyvinyl formal, polyvinyl butyral, polyvinyl acetal; (III) formaldehyde, paraformaldehyde, trioxane, etc.; (IV) natural rubber, reclaimed rubber, chlorinated rubber, normally solid or rubbery polymers of chlorprene, homopolymers of butadiene 1,3, normally solid or rubbery copolymers of butadiene 1,3 and styrene or acrylonitrile, or "polyethylene polysulphide rubbers" known as "Thiokol"; (V) acetone-formaldehyde organic reaction products soluble in an equal volume of water; (VI) monomeric or polymeric cashew nut shell liquid, cardanol, cardol, residues of cashew nut shell liquid produced by the heat distillation of cashew nut shell liquid under atmospheric or subatmospheric conditions or by steam distillation which measure 75-50% by weight of said cashew nut shell liquid, as well as said monomers and polymers being hydrogenated to saturate only the double bonds thereof in their side chains, with said monomers and polymers all being liquid at 300° F.; (VII) reaction products of any one or a combination of two or more of (VI) and an aldehyde reactive phenol, such as hydroxybenzene, cresol, xylenol, antranol and their homologues; (VIII) reaction products of any one of (VII) with an aldehyde, such as formaldehyde, paraformaldehyde, trioxane, glyoxal, furfuraldehyde, etc.; (IX) ketones such as acetone, diacetone alcohol, mesityl oxide, etc., which reaction products and the manner for producing them are well known to the art. These various combinations as well as the products (I) acid polymerized to the solid state and being solid at 450° F. provide a variety of unique and highly useful materials finding application in the rubber art generally and especially in cable coverings, in the art of coatings, castings, floor coverings, table tops, diaphragm cloths, friction elements, such as brake linings and clutch facings and in other fields as well.

Example 2

A steel drum containing 485 pounds of raw residue obtained from a Texas plant of the Phillips Petroleum Company of Bartlesville, Oklahoma, was an illustrative material used. The raw residue was the water laden residue obtained as a by-product or waste product in the purification of butadiene in which the furfural extractive distillation method was employed by that company. In this particular drum, the residue was quite heavy and a layer of water had separated out and floated on top of the residue. Most of the water layer was dipped off. Then the residue which still contained an appreciable quantity of water was transferred to a kettle, then there was added thereto an aqueous solution consisting of 30 lbs. of sulphuric acid in 5 lbs. of water and the mass was agitated to distribute the sulphuric acid substantially uniformly therethrough. Then the mass was heated to a temperature of approximately 300° F. and maintained at that temperature while under vacuum of 26–28 inches of mercury to substantially completely dehydrate the residue and to polymerize it. The polymerized product so produced is liquid or will flow at 300° F. and is hereinafter known as product IAP. The viscosity of the polymerized product, product IAP, compared with a sample of the residue which had been dehydrated under 26″ of vacuum at 300° F. was such that a solution of 10 parts of the former in 5 parts of furfural exhibited a viscosity at 25° C. at least 100% and approximately 200% greater than that of a solution of 10 parts of the latter in 5 parts of furfural. If desired, heating may be continued at 300° F. whereby the residue was converted to a substantially infusible mass, being substantially solid at 500° F. and being at least 80% insoluble in furfural. The infusible mass may be comminuted by means of a hammer mill to provide finely divided material known as product IAF useful as friction fortifying material which may be employed as discrete particles in brake linings and clutch facings.

Example 3

Into an oven maintained at 260–280° F. was placed a steel drum containing 485 lbs. of raw residue obtained from a Texas plant of the Phillips Petroleum Company of Bartlesville, Oklahoma, and being a residue obtained as a by-product in the purification of butadiene in which the furfural extractive distillation method was employed by that company. Said residue is allowed to stand in that oven at that temperature for a period of about 15–18 hours whereupon said residue was completely dehydrated and some of the higher volatiles originally contained therein had been driven off. At the end of that period the mass in the container was weighed and found to be 412 lbs. of a dark, thick, yet fluid mass soluble in furfural, having an average molecular weight above 330, having a viscosity above 2000 centipoises at 25° C. and having a melting point (ball and ring) above 60° F. This product is hereinafter known as product IB. The entire 412 lb. mass may be transferred to an open kettle and heated to approximately 425° F. and maintained at that temperature for approximately 2–5 hours. Then the source of heat may be removed and the resultant mass poured into pans and allowed to cool to room temperature. At this temperature the mass will be a thermoplastic solid insoluble in hot and cold VMP naphtha and will have a melting point (ball and ring) of 178° F. consisting chiefly of a highly polymerized reaction mass weighing approximately 305 lbs. This product is hereinafter known as product IBR. All the distillates are collected and combined and then dehydrated at 220° F. while under 28" vacuum. The dehydrated combined distillates are known as products IBD. To the combined distillates either dehydrated or not and preferably in dehydrated condition is added about 10 parts of a 45% aqueous solution of fluoboric acid for each 100 parts of said dehydrated distillate. The mass is mixed together and maintained at 350° F. and under such conditions, after 24 hours is observed and will be found to have been polymerized and converted to the substantially solid and infusible state when it will be at least 80% insoluble in furfural and will still be substantially solid at 500° F. and is known as product IBDF which may be comminuted with a hammer mill. If desired the degree of polymerization of product IBD may be stopped short of the infusible state by merely cooling the mass and neutralizing the acidic agent present to provide polymers of IBD having a viscosity at least 100% greater than product IBD and still being soluble in furural and liquid at 300° F. and such polymers will be known herein as products IBDP.

To 100 pounds of product IB were mixed 15 pounds of concentrated aqueous hydrochloric acid. The mix was heated to and maintained at approximately 290° F. until a solution of a 10 gram sample thereof at 25° C. dissolved in 5 grams of furfural had a viscosity at 25° C. about 2 times that of a solution of a 10 gram sample of the original product IB dissolved in 5 grams of furfural. At this stage the mass is quickly cooled and there is added thereto an agent to neutralize the acidic catalyst and the acid polymerized product is hereinafter known as product IBP which is liquid at 300° F. and soluble in furfural or acetone. If desired the heating may be continued under said acidic conditions until the mass is converted to the solid, infusible state and in this state is substantially solid at 500° F. and at least 80% insoluble in furfural and this product is known as product IBF.

To 100 pounds of IBR which is heated to about 300° F. is added 2 pounds of boron trifluoride dissolved in 8 pounds of ether. The temperature of the mix is raised to and maintained at 400° F. until it has been converted to the substantially solid and infusible state, and in this state is substantially solid at 500° F., at least 80% insoluble in furfural and is hereinafter known as product IBRF.

*Example 4*

Into a closed vessel is charged approximately 500 lbs. of raw residue obtained from the Sinclair Rubber Incorporated of Texas. Said residue being that obtained as a by-product in the purification of butadiene in which the furfural extractive distillation method is employed by that company. While under a vacuum of about 28" of mercury, the temperature of the raw residue is elevated slowly over about a 1 hr. period until it reaches approximately 215° F., then the source of heat is removed and the vacuum is broken. The resultant mass weighs approximately 375 lbs. is thick but pourable, has a molecular weight above 330, a viscosity above 2000 at 25° C., and is soluble in furfural and has a softening point (ball and ring) above 60° F. The material which distilled over during the course of that heat treatment under vacuum was collected and consisted mainly of water together with a small amount of light volatiles. This product, said 375 lbs. mass, is hereinafter known as product IC. If desired, while under the same degree of vacuum the mass may be further heated and maintained at a temperature of 325°–350° F. whereupon more distillate comes off, the distillate collected and the remainder is so thickened or polymerized that a sample thereof when cooled to room temperature has a melting point (ball and ring) of 130–210° F. At that stage the mass is cooled to room temperature and will be found to be a thermoplastic and substantially solid resinous mass soluble in furfural and hereinafter known as product ICR. The distillates were combined and are known as product ICD.

To 100 parts of said ICD calculated on a dry basis and being either in combination with the water or dehydrated, was added 8 parts of diethyl sulphate. The mix was heated to and maintained at 280° F. until a sample thereof had a viscosity at 25° C. approximately 10 times that of the original product ICD in dehydrated state, and this thickened or polymerized product is hereinafter known as product ICDP, is soluble in acetone and furfural and is in the liquid state.

To 100 lbs. of product IC is added 2 lbs. of an aqueous solution consisting of 1 lb. of sulphuric acid in an equal quantity of water. The mix is heated to and maintained at 325° F. until the viscosity at 25° C. of a solution of a 10 gram sample thereof in 5 grams of furfural is 2 times that of a solution of a 10 gram sample of the original product IC in 5 grams of furfural. Then the acidic agent is neutralized and cooled to room temperature. The so-thickened or polymerized mass is soluble in furfural and is liquid at 300° F. and is known as product ICP. If desired, the heating of the mix before neutralization may be continued until it is converted to the substantially solid and infusible state, in this state is solid at 500° F., at least 80% insoluble in furfural and is known as product ICF.

If product ICR is produced, to 100 parts heated to 300° F. is added 5 parts of diethyl sulphate. The mix is maintained at that temperature until it is converted to the substantially solid and infusible state and in this state is solid at 500° F. and at least 80% insoluble in furfural and is known as product ICRF, or the heating may be discontinued and a neutralizing agent added thereto to neutralize the acidic agent and the mass is quickly cooled when a 10 gram sample thereof dissolved in 5 grams of furfural provides a solution which has a viscosity at 25° C. twice that of a solution of 10 gram sample of the original ICR dissolved in 5 parts of furfural and said polymer will hereinafter be known as ICRP which will be liquid at 400° F.

*Example 5*

Following the same procedure as that employed in either Examples 2 or 3 and employing raw residue obtained from Neches Butane Products Company of Texas, there are obtained distillates and residual fractions of the raw residue. The raw residue, either as is or dehydrated, known herein as product ID, as well as the distillates and residual fractions of the residue, known herein respectively as products IDD and IDR, may be polymerized under acidic conditions, employing 100 parts by weight of any of them together with 4 parts of a 45% aqueous solution of fluoboric acid and heating the mixture at 325° F. to polymerize to the degrees set forth in Examples 2 or 3, said products being known as IDP, IDDP and IDRP respectively, or to convert them to the substantially solid and infusible state and in said state are substantially solid at 500° F. and said products are known respectively as IDF, IDDF and IDRF.

*Example 6*

Another batch of a raw residue from Phillips Petroleum Company plant at Bartlesville, Okla. was used as a starting material and hereinafter is known as product IE. The properties of this particular residue are as follows:

Although the residue starting materials contain several products, for some purposes it is considered to have a molecular weight of 192 which is the molecular weight of dibutadiene monofurfuraldehyde copolymer.

Moisture: (run by benzol method)\_\_\_\_\_percent\_\_ 16
Volatiles: 300 g. heated to 125° C. gives a loss of
  50 g. or_____percent\_\_ 16⅔
Iodine No_____ 219 Wijs Ash _____ percent__ 0.07
Viscosity: 300 g. of the residue starting materials which has been dehydrated, dissolved with 50 g. of toluene at 25° C. has a viscosity of____cp____ 1500

As another product of this invention, 100 grams of said residue starting materials which have been heated at 125° C. to remove volatiles to the amount of about 16⅔% (hereinafter called residue less volatiles) and 3 grams of diethyl sulphate were heated to 150° C. for 16 hrs. and the product is a hard infusible resin with the following characteristics:

Acetone extract_____. 25%.
Volatility of a 5 gr. pulverized sample heated to 260° C. for 2 hrs_____ 15% loss.
Volatility of a 5 g. pulverized sample heated to 370° C. for 2 hrs_____ 50% loss.

*Example 7*

100 parts of residue starting material, product IE, which has been heated to 125° C. to remove water and other volatiles, and 3 parts of diethyl sulphate were heated to from 100° C. to about 125° C. until a brittle grindable but still fusible mass is obtained and is known hereinafter as product IEP.

*Example 8*

100 parts of the residue starting material as used in Example 7 above and 3 parts of diethyl sulphate are heated to from about 100° C. to about 125° C. to obtain a thickened liquid or viscous mass. This product, known hereinafter as product IFP intermediate, can be further heated alone or with an aldehyde product such as paraformaldehyde (about 5 parts) to reach further stages of thickening and can be finally set to an infusible body. This product can be used for impregnating fabrics or for making laminations of wood, paper, fabrics or other products. The product also can be used alone or with rubber or phenolic resins as a binder for asbestos and other materials in brake linings. Also it can be cured, for example, at about 150° C. for about 16 hours to obtain an infusible body. This latter can be pulverized and used as a friction fortifier in brake linings and clutch facings and is identified as product IFF cured.

All of the various polymerized or thickened butadiene-furfural reaction products (I) which are liquid at temperatures of 500° F. or below and have herein been identified as products IAP, IDBP, IBP, ICDP, ICP, ICRP, IDP, IDDP, IDRP, IEP and IFP may each be further polymerized under acidic or alkaline conditions to convert them to the substantially solid and infusible state wherein they are solid at 500° F. after which said masses may be ground or comminuted to a fine dust and such dusts employed as friction fortifying particles in the various binders heretofore known in the art in the production of the so-called asbestos brake linings.

Said particular thickened or acid polymerized products above identified may also be employed as reactants with other materials as heretofore set forth or may be combined with various polymers and copolymers heretofore identified as (II). Generally the ratio of the former to the latter is approximately 5–2000 parts of the said particular acid polymerized or thickened butadiene-furfural products (I) to 100 parts of the one or a combination of two or more of (II). The ratio of course is dependant upon the viscosity of the particular acid polymerized butadiene-furfural reaction product (I) employed as well as the rigidity or other characteristics of the desired combination. In general said combinations may be produced by mixing together the desired acid polymerized butadiene-furfural reaction product (I) together with the desired proportions of (II). The mixture is then heated to obtain a substantially uniform mass which may be cast into suitable molds or otherwise treated, e. g. be extruded or in any other manner to provide highly useful and novel end products finding application in the field of floor covering, tubing and insulation.

Said polymers may also be compounded with various normally solid material (IV). In general one or a combination of two or more of said normally solid materials (IV) may be combined with one or a combination of two or more of said acid polymers or thickened products (I) in any number of different ways and generally with other components such as fillers, vulcanizers, accelerators, etc. and subsequently cured for obtaining novel and improved rubbery products which may be either flexible or rigid, hard or soft, depending upon the characteristics desired. By employing these various combinations it is possible to produce improved rubber stocks having good ozone resistance and other novel and highly useful characteristics. A number of different methods and apparatus may be employed for making such compositions examples of which are a rubber mill as well as the so-called Banbury mixer or other types of mixers. The ratio by weight of said acid polymers or thickened butadiene-furfural reaction products (I) to the quantity of said normally solid materials (IV) may vary over a wide range, e. g. from 3–50 parts of the former to 100 parts of the latter.

These various acid polymers of thickened butadiene-furfural reaction products (I) also find application as impregnants for fabrics, wood, paper and the like and also may be employed as adhesives for laminating together such materials. They may be spread between adjacent surfaces of components to be laminated which then may be placed under pressure and then, if desired, be heat cured to the substantially solid and infusible state under pressure and under either acidic or alkaline conditions.

This application is a continuation in part of our co-pending applications Serial Nos. 211,576, filed February 17, 1951; 238,376, filed July 24, 1951; 338,876, filed February 25, 1953, and 360,827, filed June 10, 1953.

Since certain changes in carrying out the aforesaid processes and certain modifications in the compositions which embody the invention may be made without departing from its scope, it is intended that all matter contained in the description shall be interpreted as illustrative and not in a limiting sense.

Having thus described our invention, what we claim is:

1. The method for homopolymerizing butadiene 1,3-furfural reaction product comprising heating to a temperature in the approximate temperature range of 250–450° F., a mixture having a pH no greater than approximately 3.5 and no less than approximately .3 and comprising said butadiene-furfural reaction product and acidic agent in such amount as to provide such a pH, said heating continued at least until a solution of a 10 gram sample thereof dissolved in 5 grams of furfural has a viscosity at 25° C. at least 100% greater than that of a solution of a 10 gram sample of said original reaction product in 5 grams of furfural.

2. The method for homopolymerizing butadiene 1,3-furfural reaction product comprising heating to a temperature in the approximate temperature range of 250–450° F., a mixture having a pH no greater than approximately 3.5 and no less than approximately .3 and comprising said butadiene-furfural reaction product and acidic agent in such amount as to provide such a pH, said heating continued until said mass is converted to the substantially solid and infusible state.

3. The method for homopolymerizing an organic residue containing furfural-butadiene 1,3 organic reaction product and obtained in the furfural extractive distillation method for the purification of butadiene 1,3 comprising heating in the approximate temperature range of 250–450° F., a mixture having a pH no greater than approximately 3.5 and no less than approximately .3 and comprising said residue and acidic agent in such amount as to provide such a pH, said heating continued at least until a solution of a 10 gram sample thereof dissolved in 5 grams of furfural has a viscosity at 25° C. at least 100% greater than that of a solution of a 10 gram sample of said original organic residue in 5 grams of furfural.

4. The method for polymerizing a normally liquid organic fraction obtained by the heat distillation of residue containing furfural-butadiene 1,3 organic reaction product and obtained in the furfural extractive distillation method for the purification of butadiene 1,3, comprising heating in the approximate temperature range of 250–450° F., a mixture having a pH no greater than approximately 3.5 and no less than approximately .3 and comprising said liquid fraction and acidic agent in such amount as to provide such a pH, said heating continued at least until a solution of a 10 gram sample thereof dissolved in 5 grams of furfural has a viscosity at 25° C. at least 100% greater than that of a solution of a 10 gram sample of said original liquid fraction in 5 grams of furfural.

5. The method for homopolymerizing a residual fraction liquid at 400° F., containing furfural-butadiene 1,3 organic reaction product and obtained by the heat distillation of residue obtained in the furfural extractive distillation method for the purification of butadiene 1,3, comprising heating in the approximate temperature range of 250–450° F., a mixture having a pH no greater than approximately 3.5 and no less than approximately .3 and comprising said residual fraction and an acidic agent in such amount as to provide such a pH, said heating continued at least until a solution of a 10 gram sample thereof dissolved in 5 grams of furfural has a viscosity at 25° C. at least 100% greater than that of a solution of a 10 gram sample of said original residual fraction dissolved in 5 grams of furfural.

6. A product made according to claim 1.
7. A product made according to claim 2.
8. A product made according to claim 3.
9. A product made according to claim 4.
10. A product made according to claim 5.

References Cited in the file of this patent

UNITED STATES PATENTS

| | | |
|---|---|---|
| 1,933,715 | Day | Nov. 7, 1933 |
| 2,483,903 | Herbolsheimer | Oct. 4, 1949 |
| 2,785,148 | Hillyer et al. | Mar. 12, 1957 |

OTHER REFERENCES

Hillyer et al.: Ind. and Eng. Chem., vol. 40, No. 11, November 1948, pp. 2216–2220.